Oct. 27, 1942.　　J. R. SMAK　　2,300,019

PRESSURE TESTING APPARATUS

Filed Jan. 27, 1941

Inventor:
Julius R. Smak
By Joseph O. Lange Atty.

Patented Oct. 27, 1942

2,300,019

UNITED STATES PATENT OFFICE 2,300,019

PRESSURE TESTING APPARATUS

Julius R. Smak, Bridgeport, Conn., assignor to Crane Co., Chicago, Ill., a corporation of Illinois Application January 27, 1941, Serial No. 376,165

5 Claims. (Cl. 220—24.5)

Considerable inconvenience in the hydrostatic testing of extremely high pressure vessels, such as pipe, valves, pipe fittings, etc., has long existed due to the lack of a safe, dependable and speedy means for closing the inlet and outlet openings of such vessels for the purpose of testing.

Heretofore, such vessels have been tested in a conventional manner in which the smaller sizes have been tested most frequently by clamping hydraulically actuated flanges over the ports to close them, or else in case the ports have been threaded they have been closed by appropriate screwed plugs, or where the ports are flanged and drilled, flanges have been bolted over the ports, or generally in intermediate sizes blind flanges are maintained over the ports by means of C-formed clamps. For the larger sizes, C-clamps have been generally used where the pressure vessels are provided with any sort of flanged openings; or in some cases large bulky stationary machines which clamp the pipe, valve or fitting immovably and force a gasket and a back-up flange over the respective openings have been used.

These previous methods have had serious disadvantages when used in testing large high pressure valves, pipe, or similar pressure vessels. Threaded closure members, for instance, are not practical, for the larger sizes ordinarily are not threaded. Bolting methods, while sometimes used on the ports which have been flanged and drilled for such bolting, are impractical and therefore objectionable because of the greater amount of time required, realizing, for example, that a single flange on a 60-inch pipe size port may have over fifty bolts. Large stationary machines are not therefore feasible because of the high initial cost, and last, but not least, C-formed clamps are unreasonably time-taking to assemble and also to disassemble. On the more modern types of high pressure vessels, especially those having ends machined or scarfed for welding, the narrow ledge usually provided around the welding joint for the purpose of testing provides an insecure positioning means at best making it possible for the clamps to slip off and to frequently injure adjacent workmen severely. In some cases, as on the extremely high pressure vessels, for example, it has actually been found to be physically impossible to assemble a sufficient number of these clamps about a joint in order to make it tight. Frequently, relatively high test pressures are specified which may amount to several tons per square inch in hydrostatic pressure.

Accordingly, it is a principal object of this invention to provide an apparatus for testing lengths of pipe, valves, fittings and similar pressure vessels which will not only be easy and relatively safe to use in the hands of unskilled labor but which will also act to positively render such pipes, etc. pressure-tight while being tested.

Another object is the provision of a test plug for pipe and the like which is readily portable, thereby providing a maximum amount of utility for any single unit and likewise making field testing possible with a minimum amount of inconvenience and hazard.

Still another object is to provide a test plug for pressure vessels in which the pressure of the test fluid may be utilized for the manifold purpose of (1) holding the testing plug tightly in place; (2) actuating the fluid seal, and (3) serving as a connecting medium for actually making the desired test.

A further object lies in the provision of a portable pipe plug having in cooperative relation a fluid seal and a pipe-gripping mechanism both actuated by a common source of fluid pressure.

A further object is the provision of a portable fluid-pressure actuated pipe seal or plug which is applicable to plain end pipe and the like without special lugs or other positive means of attachment being necessary to maintain the plug in place during the course of the tests.

Another important object is the provision of a compact self-locking, self-sealing portable pipe plug provided with friction increasing means, such as brake lining or the like, to positively maintain the plug within the end of a fluid-containing vessel when pressure is applied internally.

Still another object is to obtain a testing plug or closure so constructed that by increasing the test pressure the fluid seal sets proportionately more tightly and in which the gripping mechanism also holds the device more firmly in position.

These and other objects and advantages will be more readily apparent from the following description and from the appended drawing which form a part of the specification which illustrate a preferred adaptation of my invention as applied to testing pipe with any desired fluid.

Like parts are designated by like numerals throughout the drawing.

Figure 1:
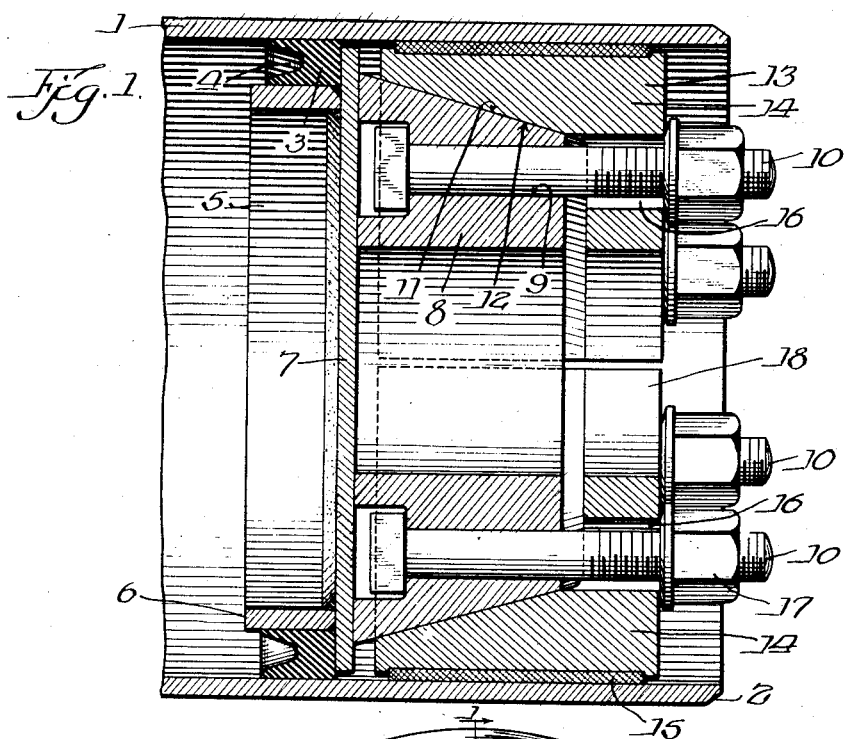
Fig. 1 is a longitudinal sectional view of a plug or stopper embodying one form of my invention shown in place in the plain end of a pipe to be tested.
Figure 2:
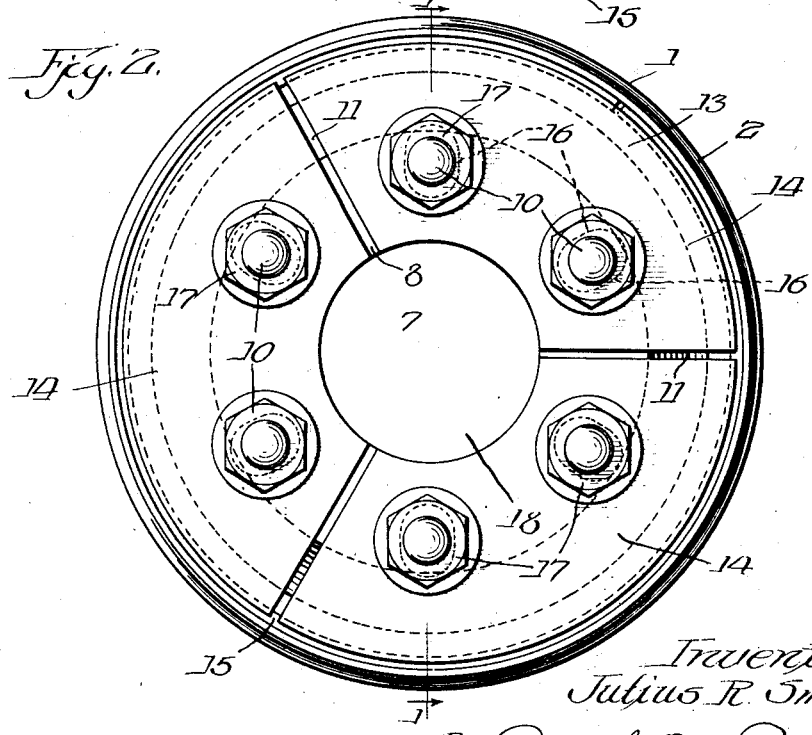
Fig. 2 is an end view of the same device looking into the pipe.

Considering the construction more specifically, the numeral 1 refers generally to a section of pipe with which my test plug may be used. Such pipe may be beveled or chamfered, as at 2, for welding but, of course, it may take any other desired configuration for suitable end connections without affecting the spirit of my invention. The fluid sealing member designated 5 consists respectively of the U-shaped pressure sealing gasket ring 3, the gasket supporting ring 6 and the preferably circular back-up plate 7. The gasket ring 3 is so arranged that its open or grooved side 4 faces the interior of the pipe in order that the pressure within such portion of the pipe may expand or spread the sides of the groove 4 of the gasket ring 3 into fluid-sealing abutment with the outer periphery of the supporting ring 6, the back-up plate 7 and the inside wall of the pipe 1. The gasket 3 is mounted circumferentially about the supporting ring 6 which in turn is welded, cast or otherwise suitably formed integrally with the circular back-up plate 7. Thus the combined fluid-sealing member generally designated 5 comprises a separate unit which, in normal operation, abuts the annular member 8 having the suitable apertures 9 for the bolts 10, the outside surface 11 of the ring 8 being frusto-conical in shape and abutting in a wedged manner similarly shaped inside surfaces 12 of the segmented expansion ring generally designated 13, each segment being specifically designated 14. Obviously while three segments are shown herein, the number may vary, depending upon the size of article to be tested. Any sheet-like material having a relatively high coefficient of friction, for example the brake lining or other composition 15, is interposed between the outer periphery of the segmented expansion ring 13 and the inside wall of the pipe 1. The bolt holes 16 in the expansion ring 13 are slotted radially, as more clearly shown in broken lines in Fig. 2, in order to allow for limited radial movement of the individual segments 14.

In applying my device and in utilizing my invention in the testing of pipe as shown in the drawing, the test plug will be inserted into the interior of each end of the pipe, or valve or fitting to be tested. The nuts 17 on the bolts 10 will be tightened, thus telescoping or longitudinally moving the ring 8 within the expansion ring 13. It will be apparent that the axial or longitudinal movement of the frusto-conical surfaces 11 and 12 of the rings 8 and 13 respectively, thus operates to force the segments 14 of the expansion ring 13 radially outward and the latter movement causes the brake lining 15 to bear positively against the inside wall of the pipe 1. The bearing angle of these frusto-conical surfaces is shown as being approximately 15-degrees from the horizontal axis indicated, but it should be obvious that even a substantial departure from this angle would still give the advantageous results disclosed herein.

When test pressure is applied within the pipe in any suitable manner it causes the groove or channel 4 and the resilient gasket ring 3 to expand into more intimate fluid-sealing contact simultaneously with the inner peripheral pipe wall, the supporting ring 6 and the back-up plate 7 as has been already described. Thus it will be evident that a sustained load equal to the test pressure multiplied by the cross-sectional area of the inside of the pipe will be exerted by the fluid upon the plate 7 and this load is transferred through the ring 8 to the ring 13 and thence to the brake lining 15 which ultimately carries the load referred to. The fluid-sealing member 5, as previously referred to, is axially movable under the influence of the test pressure whereby, with increasing pressures within the pipe, the fluid-sealing member 5 is forced against the inside surface of the ring 8. The latter member in turn further compresses the brake lining by outward radial movement of the segmented portions 14. It has been found that the radial wedging action thus produced is so effective that the nuts 17 may actually be removed without danger of the plug blowing out after pressure has once been applied within the pipe. To remove the plug after the test has been performed, the pressure is first relieved, the nuts 17 are loosened and the ring 8 is freed by moving inwardly slightly, as by tapping with a punch or similar tool, access being had to the ring 8 through the opening 18 in the expansion ring 13.

To illustrate the practical workability of my device, test plugs were made as described and inserted into the ends of a length of 12" steel pipe to be tested as described above. A test pressure of 1500 pounds per square inch was applied in an attempt to blow one or both of the plugs out of the pipe. The magnitude of this pressure, as well as the strength of the joint produced, may be realized by noting that the tested pipe itself was deformed by this pressure because its ultimate strength had been exceeded but the test plugs of my invention were still securely and tightly held in place.

I am familiar with prior test plugs but I do not believe that anyone previously has constructed a plug which has been as easily workable or as commercially feasible from so many standpoints as my test device. My design is practical in any size for any test pressure since it is self-sealing and self-locking. It was only through the press of necessity arising from the lack of suitable test plugs on the market or as disclosed in the early literature, that I was urged to develop my own apparatus which could be economically constructed and safely used as the exceptionally high test pressures that are being specified for present-day pressure equipment.

In further describing the utility of my invention, the following advantages are emphasized compared with plugs that have been utilized in the past. My construction has (1) lighter weight for any given commercial test plug; (2) simplicity of construction and application resulting in a substantial saving of the operator or test engineer's time; (3) capacity for a much higher pressure than has been previously obtainable with any other tools; (4) self-locking wedge construction which proportionately increases the friction grip capacity with the increase in applied test pressure; (5) a pliable friction surface is employed which leaves no objectionable mark or other surface defect on the tested article; (6) self-sealing packing requiring no glands, stuffing boxes or other means of mechanical sealing; (7) its applicability to finished work is simple and economical, there being no special lugs or other means of positive holding required; and (8) it is adaptable for use in any of a wide range of pipe sizes, being particularly advantageously employed in the large diameters in which there have been no other practical devices available.

Although but one single form of test plug has been illustrated, it is obvious that many modifications may be made without departing from the essential features of my invention. In summary, these features are believed to include broadly a temporary closure member of generally circular cross-sectional shape and composed of a resilient pressure-actuated seal with a pressure-retaining means employing a material having a relatively high coefficient of friction to reduce the possibility of leakage or slippage under pressure. Accordingly, I desire to be limited only by the scope of the appended claims.

I claim:

1. A testing apparatus for a pressure vessel having a sealing unit and separate retaining means therefor, said latter means comprising a resilient friction-increasing material compressed between the inside wall of an opening in such pressure vessel and the said retaining means, a pair of concentric cooperating wedge members both of which are positioned within the opening of the said vessel, the inner of said wedge members being axially movable under the influence of line pressure to produce radial expansion of said outer member and said compression of said friction-increasing material, the said sealing unit including an annular gasket of substantially C-cross-section, and a supporting member therefor.

2. A closure for testing a pressure vessel, the said closure being adapted to seal an opening or port therewithin and comprising wedge members positioned concentrically about the axis of such pressure vessel opening, the said wedge members being mounted in telescopic relation and adapted to expand radially into forcible axially immovable proximity with the inside wall of said opening, a resilient friction-increasing material interposed between said wedge members and the inside wall of the opening of the said pressure vessel, an annular pressure actuated fluid-sealing gasket of channel-shaped cross-section, and an axially movable supporting member therefor.

3. A testing closure for tubular pipe and the like, comprising a sealing ring having a continuous circumferential pressure-expansible pocket or groove, a fluid-tight axially movable carrying member therefor, expansible wedge means comprising a circular inner member with a frusto-conical outside surface, the said inner member being fitted into axial alignment with an outer separably segmented annular member having a frusto-conical inside surface whereby radial or circumferential expansion of said outer annular member is effected by telescopic contraction of said inner and outer members, friction-increasing means mounted on the outside surface of said wedging means for retaining said sealing ring.

4. A test plug or stopper for a pressure vessel, comprising in combination an expansible locking unit and a separate axially movable sealing unit, said locking unit consisting of a motion retarding high friction material normally compressed between the wall of said pressure vessel and the outer periphery of an inner member, the latter comprising circular, segmented, radially expansible wedging means, the said wedging means having generally frusto-conical combined pressure- and screw-operable wedging members, an annular gasket having a hollowed-out face portion exposed to internal pressure, a supporting member for said gasket, the said supporting member bearing against the wedging means to transmit the internal pressure of the vessel thereagainst.

5. A pipe testing device of the character described for a pressure vessel, comprising expansible means composed of telescopically assembled wedge members having cooperatively abutting frusto-conical surfaces, the outer of said members being separably segmented to expand radially, a resilient friction-increasing material interposed between said segmented members and the inner wall of said pressure vessel, the inner of said wedge members being directly acted upon by internal fluid pressure, whereby the outer segmented member expands radially, an axially movable pressure-actuated fluid sealing means abutting said expansible means in direct communication with the internal fluid pressure.

JULIUS R. SMAK.